United States Patent [19]
Aoyama

[11] 4,303,303
[45] Dec. 1, 1981

[54] MECHANICAL OPTICAL SWITCHING DEVICE

[75] Inventor: Tsutomu Aoyama, Tokyo, Japan

[73] Assignee: Nippon Electric Company, Ltd., Tokyo, Japan

[21] Appl. No.: 97,648

[22] Filed: Nov. 27, 1979

[30] Foreign Application Priority Data

Nov. 29, 1978 [JP] Japan ............................ 53-147620

[51] Int. Cl.³ .............................................. G02F 1/00
[52] U.S. Cl. ............................ 350/96.20; 350/96.18; 350/485; 350/486
[58] Field of Search ................. 350/96.18, 96.20, 484, 350/485, 486, 487

[56] References Cited

U.S. PATENT DOCUMENTS 4,124,271 11/1978 Green ............................. 350/96.20
4,148,558 4/1979 Schuck ............................ 350/96.20

OTHER PUBLICATIONS

Nunoshita et al., "Optical Switch for Multimode Optical-Fiber Systems" in Optics Letts., vol. 4, No. 1, Jan. 1979.
Fujii et al., "Low-Loss 4×4 Optical Matrix Switch for Fiber-Optic Communication" in Electronics Letts., vol. 15, No. 14, Jul. 1979.
Tomlinson et al., "Multiposition Optical-Fibre Switch" in Electronics Letts., vol. 15, No. 6, Mar. 1979.
Mito et al., "Electrically Driven Rotating Mirror Type Multichannel Optical Switch" *1978 Electronic Comm. Soc. National Conference*, paper No. 860.
"Conference on Laser & Electrooptical Systems", Feb. 7-9, 1978, OSA/IEEE, San Diego, Calif.-Digest of Technical Papers, pp. 54-55.
"Electrically Switched Optical Directional Coupler: Cobra", M. Papuchon, et al. in Appl. Phys. Letts, vol. 27, No. 5, Sep. 1975, pp. 289-291.

*Primary Examiner*—Stewart J. Levy
*Attorney, Agent, or Firm*—Laff, Whitesel, Conte & Saret

[57] ABSTRACT

A mechanical switch for light transmitted over optical fibers has one input collimating and a pair of output converging lenses. One optical fiber transmits incoming light, bearing information signals onto said input lenses. A first triangular prism path normally directs the incoming light emerging from the input lens onto one of the output lenses. A mechanical switch selectively inserts a parallelogram prism into a path followed by light emerging from the input lens in order to switch the light onto a second triangular prism and thereby direct the light to the other output lens, when the parallelogram prism is switched into the path from the input lens. Optical fibers are individually associated with each of the output lens for transmitting light which is outgoing from the mechanical switch.

11 Claims, 4 Drawing Figures

MECHANICAL OPTICAL SWITCHING DEVICE

This invention relates to optical switching devices for use in communication systems and, more particularly, to mechanical switching devices for use when switching optical transmission paths.

Optical communication systems use optical fibers as a transmission medium. These fibers have been intensively developed, with a great public concern, attracting much attention and widespread use. Thus, optical switching devices are indispensable for making the mutual connections and disconnections of optical transmission paths.

More specifically, a semiconductor laser is used as a light source at each of a plurality of repeaters. Each repeater has optical switching devices, for completing paths and enabling the optical communication over such paths. However, no semiconductor lasers have been developed, as yet, with a sufficient lifetime; therefore, a great number of semiconductor lasers are usually provided in each of the repeaters in order to maintain the reliability of communications. When one laser, which is in use, fades near the end of its lifetime, another laser is activated. The remaining lasers are subsequently activated in this same manner. However, maintenance of these light sources involves much troublesome work.

A conventional optical switching device uses an electro-optical switch based on the optical integration technique described in a paper entitled "Electrically Switched Directional Coupler: Cobra," M. Papuchon et al, APPLIED PHYSICS LETTERS, Vol. 27, No. 5, pp. 289-291, September 1 issue, 1975. This switching device can be operated at a high switching speed. However, it has a disadvantage since it has a large insertion loss, which is greatly affected by changes in temperature.

As one solution of this temperature-sensitivity and insertion loss problem, there is an approach which employs a mechanical, optical switching device with a low insertion loss, but also with a relatively low switching speed. For details about this switching device, reference is made to a paper entitled "WFF2 Optical Fiber Switches and Their Application" by M. Shimizu et al, Digest of Technical Papers distributed in a CONFERENCE relating to LASER AND ELECTRO-OPTICAL SYSTEMS, held in California, Feb. 7 to 9, 1978, pp. 54-55; in particular, see FIG. 2B. This switching device has a large prism for performing the switching operation for the fibers 1, 2 and 3, which are shown in FIG. 2B. The use of such a large prism is indispensable in this device in order to widen the mutual intervals among the fibers 1, 2 and 3. As a result, a substantially large current is needed to actuate the prism-driving electromagnets, thereby causing a further decrease in the switching speed for selecting between the fibers.

Thus, an object of the invention is to provide mechanical, optical-switching devices, with a high switching speed and a low power consumption.

One aspect of the present invention provides a mechanical, optical-switching device as an input receptacle with an input optical fiber mounted therein and two output receptacles leading to two output optical fibers. Two pairs of reflecting surfaces are positioned within the switch for respectively reflecting light from the input optical fiber to the two output fibers, respectively. A third pair of reflective surfaces, which is interposed between the input and output receptacles, selectively slides back and forth to switch the incoming light signal from the input fibers to either one of the output fibers. Opposed electromagnets are energized with either of two polarities in order to selectively slide the third pair of reflective surfaces between two switching positions, for diverting the incoming light at the input receptacle to one of the output receptacles.

Now the invention will be described in greater detail in conjunction with the accompanying drawings, in which.

Figure 1:
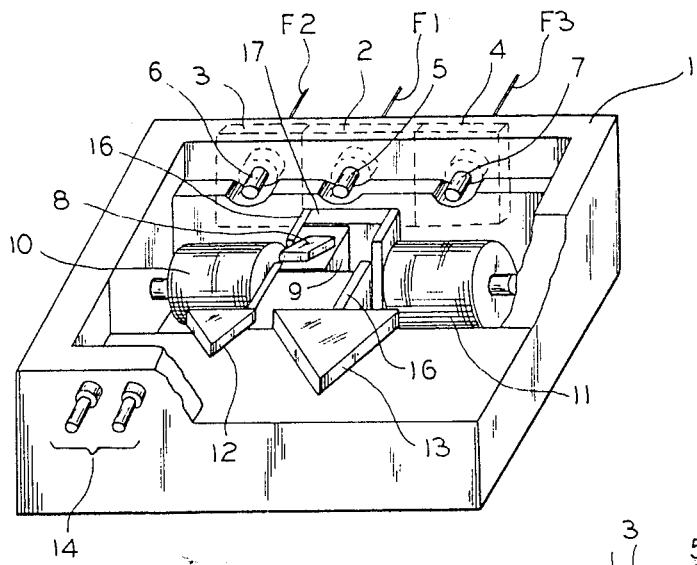
FIGS. 1 and 2 are, respectively, a perspective view (partially brokwn away) and a plan view of one embodiment of a mechanical switch incorporating the invention.

Briefly, FIG. 1 shows a mechanical device for switching light transmitted over optical fibers F1,F2,F3. Incoming light bearing information signals is transmitted over fiber F1 to an input lens 5 and outgoing light bearing the same signal is transmitted from either one of a pair of output lens 6,7 over fibers F2,F3. The invention provides the means for switching the incoming light signal on fiber F1 to either fiber F2 or F3.

Figure 2:
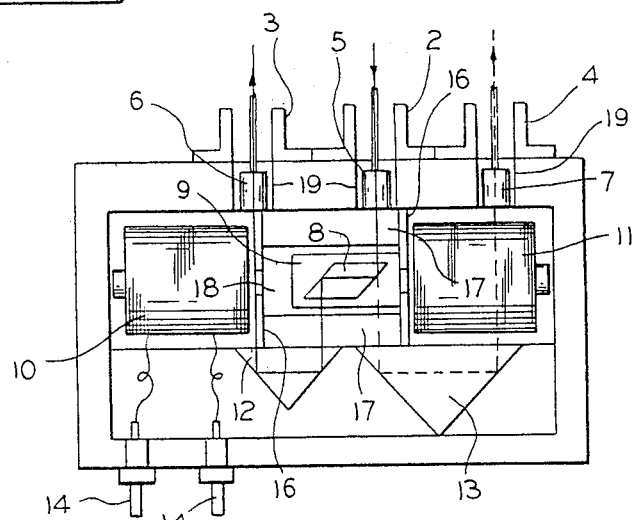

A first and fixed triangular prism 13 normally directs the incoming light fromthe input lens 5 onto one of the output lens 7, via a path shown by dashed lines in FIG. 2. A mechanical switch selectively inserts a parallelogram prism 8 into a path followed by the light from the input lens 5 in order to switch the incoming light on to a second and fixed triangular prism 12. This switching of prism 8 directs the light over a path shown by solid lines in FIG. 2 to the other output lens 6.

Figure 3:
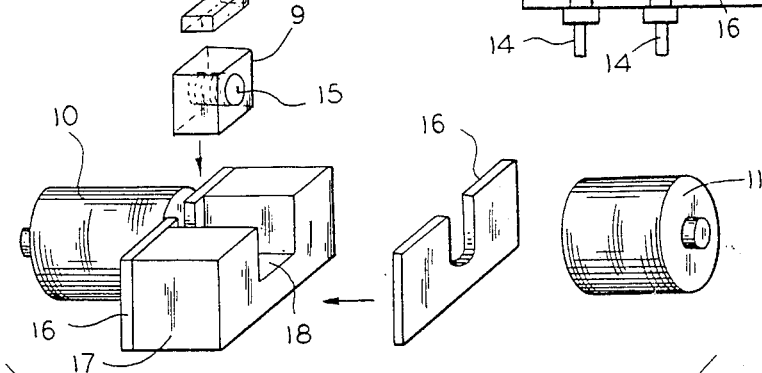
FIG. 3 is a perspective view (partly exploded) of a part of the embodiment shown in FIGS. 1 and 2.

The mechanical switch (FIG. 3) comprises the parallelogram prism 8 mounted on a sliding block 9 having a permanent magnet 15 associated theretih. A pair of electromagnetic coils 10,11 are positioned adjacent the sliding block 9 for selectively applying a magnetic field with a polarity which may be reversed, relative to the polarity of the permanent magnet 15, for controlling the position of sliding block and, therefore, the position of the parallelogram prism 8.

In greater detail, FIGS. 1 and 2 show the inventive switching device having an input receptacle 2 with an input optical fiber (F1) mounted therein. First and second output receptacles 3 and 4 are mounted on opposite sides of input receptacle 2, each output receptacle having an output fiber (F2,F3) mounted therein. The input light beam is transmitted through the input receptacle 2, to an input lens 5, for collimating the light.

A parallelogram prism 8 is disposed in the optical path, and at the rear of the input lens 5. Prism 8 has two perfect, reflecting surfaces which are opposite and parallel to each other in order to reflect the collimated light beam passing through the input lens 5. A first triangular prism 12, which is disposed at the rear of the parallelogram prism 8, has two perfect, reflecting surfaces for reflecting the collimated light beam received from the prism 8. A second triangular prism 13, which is also disposed at the rear of the prism 8, has two perfect reflecting surfaces for reflecting the collimated light beam passing through the input lens 5, when the parallelogram prism 8 is moved out of the light path.

First and second output lenses 6 and 7 are disposed in front of the first and second output receptacles 3 and 4 for converging the collimated light beams after they have passed through the first and second triangle prisms 12 and 13.

Electromagnets 10 and 11 provide a motive force for inserting or removing the parallelogram prism 8 into or away from the optical path defined by the axis of the input lens 5.

A suitable housing or case 1 receives, supports and accommodates the above-mentioned structural elements. This case 1 is made from a non-magnetic material such as aluminum, plastic (preferably a resin), or the like. The input receptacle 2, and the output receptacles 3 and 4 are mounted on one of the side walls of the case 1, with the output receptacles 3 and 4 being disposed on opposite sides of the input receptacle 2.

The receptacle 2 has an input fiber F1 for introducing an incoming input light beam containing meaningful information into the present switching device. Similarly, the receptacles 3 and 4 have output fibers F2,F3 for transmitting the output light beams.

Further, through-holes 19 (FIG. 2) are formed in the side wall of case 1, with the receptacles 2, 3 and 4 attached over the corresponding holes. The input rod lens 5 converts the light beam for the receptacle 2 into a collimated light beam. The output rod lenses 6 and 7 are arranged in front of the output receptacles 3 and 4, respectively, for converging the light beam received from the receptacle 2. These lenses are fixed in the holes 19, by means of a proper cement or binding agent, such as epoxy resin. Further provided within the case 1 are a holder 9 for the parallelogram prism, reflecting member 8 and a guide member 17 (FIG. 3) for guiding and directing the holder 9, as it slides back and forth. The electromagnets 10 and 11 are driven responsive to electric power supplied through power source terminals 14 (FIGS. 1 and 2).

The guide member 17 (FIG. 3) has a groove 18, along which the holder 9 slides. The parallelogram prism, reflecting member 8, is mounted on the holder 9 which contains a permanent magnet 15 for giving a polarity preference to the member 9. On both sides of the guide members 17 are motion limit stops 16 which prevent the holder 9 from moving beyond the ends of groove 18. The guide member 17, the holder 9 and the stops 16 may be made of a corrosion-resistive material, such as stainless steel, for example.

Figure 4:
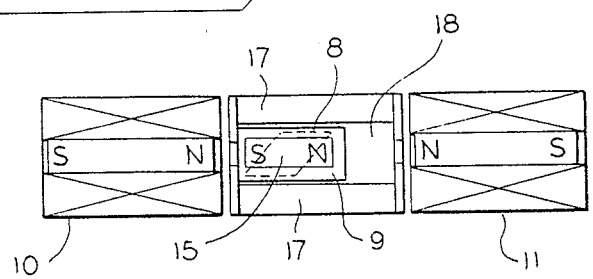
FIG. 4 shows a part of the embodiment which is useful in describing the operation of the invention.

The operation of the present switching device will be described next, with reference to FIGS. 2 and 4. It is first assumed that the electromagnets 10 and 11 are energized (as shown in FIG. 4) in such a manner that the holder 9 is attracted by the electromagnet 10 and repelled by electromagnet 11. Therefore, holder 9 slides leftwardly in groove 18 until it encounters the left-hand limit stop 16, as shown in FIG. 4.

When the parallelogram prism 8 is out of the light transmission path, the light beam emitted through the input receptacle 2 is collimated by the lens 5. The collimated light beam is reflected by the prism 13 and then converged by the lens 7 into the receptacle 4 (as shown by dashed lines in FIG. 2). Thus, an input light signal received at input 2 is switched to output 4.

When the electromagnets 10 and 11 are energized with opposite magnetic polarities, the parallel prism reflecting member 8 is moved into the light path. The prism 8 is now placed on the axial line of the lens 5, so that the optical path of the collimated light beam coming from lens 5 is changed within the reflecting member 8 (as shown by the solid line path of FIG. 2). With the optical path thus changed, the light beam is reflected by the prisms 8 and 12, and then is converged by the lens 6 into the output receptacle 3.

As described above, the input light beam received through receptacle 2 is directed toward either output receptacle 3 or output 4, depending on whether the parallel prism-reflecting member 8 is or is not inserted into the optical path including the axial line of the lens 5.

With such a construction, the relatively small size electromagnets 10 and 11 may be used for driving the parallelogram prism, reflecting member 8 toward the left or right. Thus, the optical path of the collimated light is changed by movement of a very small parallelogram prism 8, and it is reflected by one of the triangle prisms 12 and 13 depending upon the position of prism 8.

A mechanical optical switching device designed on the basis of the structure of FIG. 1 brought about the following results: insertion loss of the switch, switching speed, and cross talk are 1.5 dB (decibel), 5 ms (milliseconds) and less than −55 dB, respectively.

The physical dimensions of the components used in this embodiment were as follows: graded-index rod lenses are used for the lenses 5, 6 and 7, each lens being 2.7 mm (millimeters) in length and 1.8 mm in diameter; the spacing between the lenses 5 and 6 or 5 and 7 is 16 mm; a graded-index type of fibers is coupled with the receptacles 2, 3 and 4, the core diameter being sixty microns and the N.A. (numerical aperture)=0.21; a light-emitting diode with the wave length 0.85 micron is used as the light source (not shown); the drive voltage and current for the electromagnets 10 and 11 are twelve volts and 50 milliamperes, respectively; the prisms 9 and 13 have bottom side lengths of 16 mm and 18 mm, respectively, and the case 1 is 53 mm wide, 17 mm high and 26 mm deep.

Those who are skilled in the art will readily perceive how to modify the system. Therefore, the appended claims are to be construed to cover all equivalent structures which fall within the true scope and spirit of the invention.

What is claimed is:

1. A mechanical optical switching device comprising: an input receptacle means having an input optical fiber mounted therein; first and second output receptacle means, each having an output fiber mounted therein for selectively giving an output signal responsive to an input light beam transmitted over an optical fiber in said input receptacle means; input lens means associated with said input receptacle for collimating said input light beam; first optical path-changing means having two surfaces for reflecting the light beam passing from said input optical fiber and through said input lens, said first optical path-changing means being disposed in the optical oath and at the rear of said input lens; second optical path-changing means having two reflecting surfaces for reflecting the light beam from said first optical path-changing means, said second optical path-changing means being disposed at the rear of said first optical path-changing means; third optical path-changing means having two reflecting surfaces for reflecting the light beam passing through said input lens, said third optical path changing means being disposed at the rear of said first optical path-changing means; first and second output lenses disposed in front of said first and second output receptacles for converging said light beams after passing through said second and third optical path-changing means; and means for inserting or removing said first optical path-changing means in the optical axis of said input lens for switching said input light beam from between said output receptacles.

2. A mechanical optical switching device as claimed in claim 1, wherein said first optical path-changing means comprises a parallelogram prism with two reflecting surfaces which are opposite to each other.

3. A mechanical optical-switching device as claimed in claim 1 wherein each of said second and third optical path-changing means comprises a triangle prism.

4. A mechanical switch for an optical path, said switch comprising one input collimating and a pair of output converging lenses, means for transmitting incoming light-bearing information signals onto said input lenses, first light path directing means for normally directing said incoming light emerging from said input lens onto one of said output lens, mechanical switching means for selectively inserting second light path-directing means into a path followed by said light emerging from said input lens, third light path-directing means positioned to receive light from said second light path-directing means when said second means is switched into the path from said input means, said third means redirecting light received from said second means onto the other of said output lens, and means individually associated with each of said output lens for transmitting light which is outgoing from said output lens.

5. The switch of claim 4 wherein each of the means for transmitting light is an optical fiber which is individually associated with one of said collimating lens.

6. A mechanical switch for an optical path, said switch comprising one input collimated lens and a pair of output converging lenses, means for transmitting incoming light-bearing information signals onto said input lens, first light path directing means for normally directing said incoming light emerging from said input lens onto one of said output lens, mechanical switching means for selectively inserting second light path-directing means into a path followed by said light emerging from said input lens, third light path-directing means positioned to receive light from said second light path-directing means when said second means is switched into the path from said input lens, said third means redirecting light received from said second means onto the other of said output lens, means individually associated with each of said output lens for transmitting light which is outgoing from said output lens, each of the means for transmitting light being an optical fiber which is individually associated with one of said collimating lens, each of said lenses being located on one side of a housing and each of said light path-directing means comprises an associated pair of light-reflecting surfaces defining a generally U-shaped path extending between pairs of said lenses.

7. The switch of claim 6 wherein each said first and third light path-directing means comprises a triangular prism.

8. The switch of claim 7 wherein said second light path-directing means comprises a parallelogram prism with two reflecting surfaces which are opposite each other.

9. The switch of claim 8 wherein said mechanical switch comprises said parallelogram prism mounted on a sliding block having a permanent magnetic polarity, and a pair of electromagnetic coils adjacent said sliding block for selectively applying a magnetic field with a selectively reversible polarity relative to said permanent magnetic polarity for controlling the position of said sliding block.

10. A mechanical switch for an optical path, said switch comprising one input collimating lens and a pair of output converging lenses, means for transmitting incoming light-bearing information signals onto said input lens, first light paths directing means for normally directing said incoming light emerging from said input lens onto one of said output lens, mechanical switching means for selectively inserting second light path-directing means into a path followed by said light emerging from said input lens, third light path-directing means positioned to receive light from said second light path-directing means when said second means is switched into the path from said input lens, wherein each of said first and third light path-directing means comprises a triangular prism, said third means redirecting light received from said second means onto the other of said output lens, and means individually associated with each of said output lens for transmitting light which is outgoing from said output lens.

11. A mechanical switch for an optical path, said switch comprising one input collimating lens and a pair of output converging lenses, means for transmitting incoming light-bearing information signals onto said input lens, first light path directing means for normally directing said incoming light emerging from said input lens onto one of said output lens, mechanical switching means for selectively inserting second light path-directing means into a path followed by said light emerging from said input lens, third light path-directing means positioned to receive light from said second light path-dircting means when said second means is switched into the path from said input lens, each of said first and third light path-directing means comprising a triangular prism, said third means redirecting light received from said second means onto the other of said output lens, and means individually associated with each of said output lens for transmitting light which is outgoing from said output lens, each of the means for transmitting light being an optical fiber which is individually associated with one of said collimating lens.

* * * * *

UNITED STATES PATENT AND TRADEMARK OFFICE
CERTIFICATE OF CORRECTION

PATENT NO. : 4,303,303
DATED : DECEMBER 1, 1981
INVENTOR(S) : Tsutomu Aoyama

It is certified that error appears in the above—identified patent and that said Letters Patent is hereby corrected as shown below:

Col. 1, Line 31, insert --by-- after "Cobra,";

Col. 1, Line 61, "as" should be --has--;

Col. 2, Line 39, "theretih" should be --therewith--;

Col. 4, Line 36, "," should be --;--.

CLAIMS:

Col. 4, Line 56, "oath" should be --path--;

Col. 5, Line 24, "means" (1st. occurrence) should be --lens--;

Col. 6, Line 4, insert --or 10 or 11-- after "7".

Signed and Sealed this

Twentieth Day of April 1982

[SEAL]

Attest:

GERALD J. MOSSINGHOFF

Attesting Officer    Commissioner of Patents and Trademarks